United States Patent
Onitake

(10) Patent No.: US 9,630,492 B2
(45) Date of Patent: Apr. 25, 2017

(54) FOUR-WHEEL DRIVE VEHICLE AND METHOD FOR CONTROLLING FOUR-WHEEL DRIVE VEHICLE

(71) Applicant: JTEKT CORPORATION, Osaka-shi (JP)

(72) Inventor: Minoru Onitake, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/804,393

(22) Filed: Jul. 21, 2015

(65) Prior Publication Data
US 2016/0023550 A1    Jan. 28, 2016

(30) Foreign Application Priority Data
Jul. 28, 2014    (JP) ................. 2014-152605

(51) Int. Cl.
| | |
|---|---|
| *B60K 17/02* | (2006.01) |
| *B60K 17/348* | (2006.01) |
| *B60K 17/35* | (2006.01) |
| *B60K 23/08* | (2006.01) |

(52) U.S. Cl.
CPC ........ *B60K 17/348* (2013.01); *B60K 17/3515* (2013.01); *B60K 2023/0858* (2013.01)

(58) Field of Classification Search
CPC .............. B60K 17/348; B60K 17/3515; B60K 2023/0858
See application file for complete search history.

(56) References Cited

U.S. PATENT DOCUMENTS

| | | | |
|---|---|---|---|
| 2008/0015778 A1* | 1/2008 | Matsuura | G08G 1/166 701/301 |
| 2010/0030443 A1* | 2/2010 | Okamoyo | B60K 17/346 701/72 |
| 2010/0044138 A1* | 2/2010 | Marsh | B60K 17/348 180/247 |
| 2010/0094519 A1 | 4/2010 | Quehenberger et al. | |

(Continued)

FOREIGN PATENT DOCUMENTS

| | | |
|---|---|---|
| JP | 2010-100280 | 5/2010 |
| JP | 2011-149535 | 8/2011 |

*Primary Examiner* — Kevin Hurley
*Assistant Examiner* — Gabriela C Craciun
(74) *Attorney, Agent, or Firm* — Oblon, McClelland, Maier & Neustadt, L.L.P.

(57) ABSTRACT

A four-wheel drive vehicle are provided which enable enhancement of responsiveness to switching from a two-wheel drive state to a four-wheel drive state. A four-wheel drive vehicle includes a driving force transmission and cut-off apparatus that enables cut-off of transmission of a driving force from an engine to a propeller shaft, a driving shaft that rotates under a tuning force of the propeller shaft, a pair of hydraulic clutches and each disposed between the driving shaft and a corresponding one of rear wheels, and a control apparatus that controls a hydraulic unit that supplies hydraulic oil to the hydraulic clutches. In shifting the two-wheel drive state to the four-wheel drive state, the control apparatus controls the hydraulic unit such that a higher priority is given to supply of the hydraulic oil to first hydraulic clutch than to supply of the hydraulic oil to second hydraulic clutch.

14 Claims, 10 Drawing Sheets

(56) References Cited

U.S. PATENT DOCUMENTS

| | | | | |
|---|---|---|---|---|
| 2010/0274456 A1* | 10/2010 | Kondo | ............... | B60K 23/08 |
| | | | | 701/69 |
| 2012/0290179 A1* | 11/2012 | Oishi | .................. | B60T 7/042 |
| | | | | 701/54 |
| 2013/0297133 A1* | 11/2013 | Hasegawa | ............ | B60K 6/445 |
| | | | | 701/22 |
| 2014/0007740 A1* | 1/2014 | Takahashi | ............ | B60K 6/445 |
| | | | | 74/665 A |
| 2014/0129106 A1* | 5/2014 | Matsuzaki | .......... | B60W 10/06 |
| | | | | 701/69 |
| 2015/0019094 A1* | 1/2015 | Larkin | ................ | B60K 23/08 |
| | | | | 701/65 |
| 2015/0096821 A1* | 4/2015 | Arai | .................. | B60K 17/02 |
| | | | | 180/233 |

\* cited by examiner (FIRST EMBODIMENT)

(SECOND EMBODIMENT)

(SECOND EMBODIMENT)

FOUR-WHEEL DRIVE VEHICLE AND METHOD FOR CONTROLLING FOUR-WHEEL DRIVE VEHICLE

INCORPORATION BY REFERENCE

The disclosure of Japanese Patent Application No. 2014-152605 filed on Jul. 28, 2014 including the specification, drawings and abstract, is incorporated herein by reference in its entirety.

BACKGROUND OF THE INVENTION

1. Field of the Invention

The invention relates to a four-wheel drive vehicle that enables switching between a four-wheel drive state where a driving force of a driving source is transmitted to main driving wheels and auxiliary driving wheels and a two-wheel drive state where the driving force of the driving source is transmitted only to the main driving wheels, and relates to a method for controlling the four-wheel drive vehicle.

2. Description of Related Art

Known four-wheel drive vehicles that enable switching between a four-wheel drive state and a two-wheel drive state are described in Japanese Patent Application Publication No. 2010-100280 (JP 2010-100280 A) and Japanese Patent Application Publication No. 2011-149535 (JP 2011-149535 A).

JP 2010-100280 A describes, as a sixth embodiment, a four-wheel drive vehicle including a driving unit that generates a driving force, a propeller shaft (torque transmission section) that receives, via a torque distribution device, the driving force generated by the driving unit, a dog clutch that enables cutting off of torque transmission from the driving unit to the propeller shaft, a pair of multidisc clutches including a plurality of clutch discs that enable adjustment of a torque transmitted from the propeller shaft to right and left rear wheels, and a control unit that controls the dog clutch and the multidisc clutches.

In the two-wheel drive state of this four-wheel drive vehicle, the control unit performs control to cut off the driving force transmission through the dog clutch and also cut off the driving force transmission through the multidisc clutches. As a result, the driving force transmission is cut off both the front wheel side and the rear wheel side of the propeller shaft, and rotation of the propeller shaft is stopped. Thus, when the rotation of the propeller shaft is stopped during traveling in the two-wheel drive state, traveling resistance is reduced to enhance the fuel efficiency of the four-wheel drive vehicle.

The four-wheel drive vehicle described in JP 2011-149535 A includes a pair of hydraulic clutches that transmits the rotational torque of the propeller shaft to the right and left rear wheels. An actuation circuit that actuates the hydraulic clutches includes an oil pump that supplies hydraulic oil and a pressure regulating valve that adjusts hydraulic pressure acting on pressing components that press the hydraulic clutches. Each of the hydraulic clutches has multiple clutch plates (frictional engagement components) that can be frictionally engaged with one another. The clutch plates are pressed by the pressing component and frictionally engaged with one another.

When the four-wheel drive vehicle described in JP 2010-100280 A is switched from the two-wheel drive state to the four-wheel drive state, first, a frictional force is generated between the clutch discs of the multidisc clutch to transmit the turning force of the right and left rear wheels to the propeller shaft. The propeller shaft rotates to achieve rotational synchronization at the dog clutch, and then the dog clutch is coupled to the propeller shaft. Thus, a state is set up in which the driving force generated by the driving unit can be transmitted to the right and left rear wheels, that is, the four-wheel drive state is set up.

On the other hand, during traveling in the two-wheel drive state where the rotation of the propeller shaft is stopped, the clutch discs in the multidisc clutch rotate relative to one another. When the relative rotation causes a drag torque, the effect of enhancing the fuel efficiency may not be sufficiently exerted. For a reduced drag torque, increasing the gap between the clutch discs is effective. However, in this case, coupling and uncoupling responsiveness of the clutches may be degraded.

The trade-off between the reduction in the drag torque of the clutches and the responsiveness of the clutches may similarly result from the hydraulic pressing of the plurality of clutch plates as in the technique described in JP 2011-149535 A. That is, there has also been a desire to achieve both a reduction in drag torque and enhancement of the responsiveness to switching from the two-wheel drive state to the four-wheel drive state when, for example, the multidisc clutches in the four-wheel drive vehicle described in JP 2010-100280 A are hydraulically controlled.

SUMMARY OF THE INVENTION

An object of the present invention is to provide a four-wheel drive vehicle that allows enhancement of responsiveness to switching from a two-wheel drive state to a four-wheel drive state while suppressing an increase in a drag torque of clutches, and a method for controlling the four-wheel drive vehicle.

According to an aspect of the present invention, a four-wheel drive vehicle enables switching between a four-wheel drive state where a driving force of a driving source is transmitted to a pair of right and left main driving wheels and a pair of right and left auxiliary driving wheels and a two-wheel drive state where the driving force of the driving source is transmitted only to the main driving wheels. The four-wheel drive vehicle includes:

a propeller shaft that transmits the driving force of the driving source to the auxiliary driving wheels in the four-wheel drive state; a transmission and cut-off mechanism that cuts off transmission of the driving force from the driving source to the propeller shaft in the two-wheel drive state and that enables transmission of the driving force from the driving source to the propeller shaft in the four-wheel drive state; a driving shaft that rotates under a turning force of the propeller shaft and that has a central axis extending in a vehicle width direction; a pair of hydraulic clutches each disposed between the driving shaft and a corresponding one of the auxiliary driving wheels and having a plurality of clutch plates that enable the driving force to be frictionally transmitted; a hydraulic unit that supplies hydraulic oil to the hydraulic clutches and that brings the clutch plates into frictional contact with one another using the hydraulic oil; and a control apparatus that controls the hydraulic unit.

In shifting the two-wheel drive state to the four-wheel drive state, the control apparatus gives a higher priority to supply of the hydraulic oil to a first hydraulic clutch of the pair of hydraulic clutches than to supply of the hydraulic oil to a second hydraulic clutch of the pair of hydraulic clutches.

According to the aspects, it is possible to enhance responsiveness to switching from the two-wheel drive state to the four-wheel drive state while suppressing an increase in the drag torque of the clutches.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
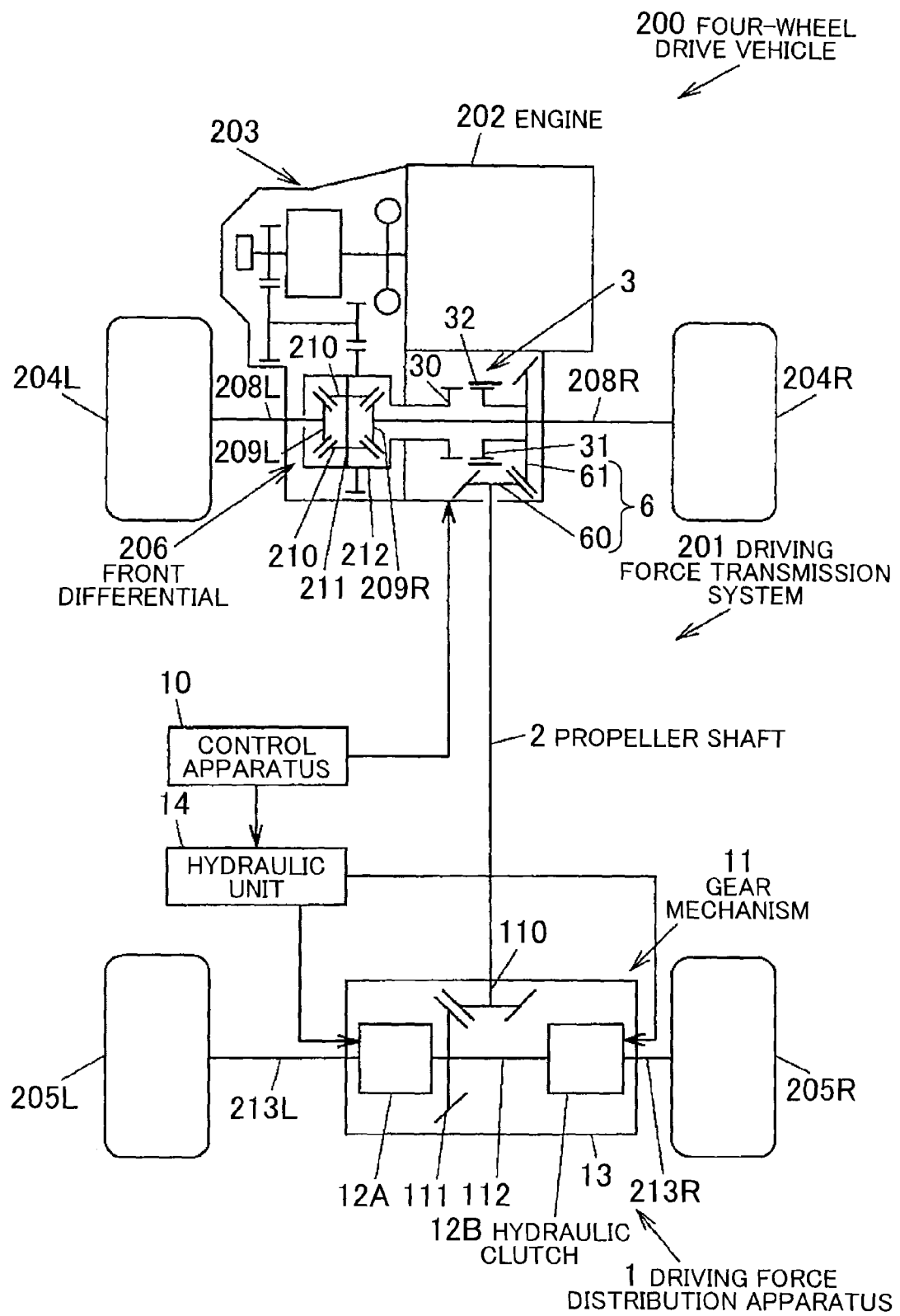
FIG. 1 is a plan view depicting a general configuration of a four-wheel drive vehicle according to a first embodiment of the present invention.

Embodiments of the present invention will be described with reference to the attached drawings. FIG. 1 depicts a general configuration of a four-wheel drive vehicle according to a first embodiment of the present invention.

A four-wheel drive vehicle 200 includes an engine 202 serving as a driving source, a transmission 203, front wheels 204R and 204L serving as a pair of right and left main driving wheels and rear wheels 205R and 205L serving as a pair of right and left auxiliary driving wheels, a driving force transmission system 201 that transmits a driving force of the engine 202 to the front wheels 204R and 204L and the rear wheels 205R and 205L, and a control apparatus 10 that controls the driving force transmission system 201. In the present embodiment, R and L in relevant reference numerals mean the right and the left, respectively, with respect to a forward direction of a vehicle.

The four-wheel drive vehicle 200 enables switching between a four-wheel drive state where the driving force of the engine 202 is transmitted to the front wheels 204R and 204L and the rear wheels 205R and 205L and a two-wheel drive state where the driving force of the engine 202 is transmitted only to the front wheels 204R and 204L.

The driving force transmission system 201 is disposed in a driving force transmission path from the transmission 203 to the rear wheels 205R and 205L in the four-wheel drive vehicle 200, and is mounted on a vehicle body (not shown) of the four-wheel drive vehicle 200.

The driving force transmission system 201 includes a driving force distribution apparatus 1, a propeller shaft 2, a driving force transmission and cut-off apparatus 3, and a front differential 206. The driving force transmission system 201 is configured to switching the drive state of the four-wheel drive vehicle 200 between the two-wheel drive state and the four-wheel drive state.

The front differential 206 includes side gears 209R and 209L, a pair of pinion gears 210, a pinion shaft 211, and a front differential case 212. The front differential 206 is disposed between the transmission 203 and the driving force transmission and cut-off apparatus 3. The side gear 209R is coupled to an axle shaft 208R of the corresponding front wheel. The side gear 209L is coupled to an axle shaft 208L of the corresponding front wheel.

The engine 202 outputs the driving force to the axle shafts 208R and 208L of the front wheels via the transmission 203 and the front differential 206 to drive the front wheels 204R and 204L.

The engine 202 also outputs the driving force to axle shafts 213R and 213L of the rear wheels via the transmission 203, the driving force transmission and cut-off apparatus 3, the propeller shaft 2, and the driving force distribution apparatus 1 to drive the rear wheels 205R and 205L.

The propeller shaft 2 is disposed between the driving force distribution apparatus 1 and the driving force transmission and cut-off apparatus 3. In the four-wheel drive state, the propeller shaft 2 receives the driving force of the engine 202 from the driving force transmission and cut-off apparatus 3 via the front differential case 212 to transmit the driving force to the rear wheels 205R and 205L. At a front-wheel-side end of the propeller shaft 2, a front-wheel-side gear mechanism 6 is disposed which includes a drive pinion 60 and a ring gear 61 that mesh with each other.

The driving force transmission and cut-off apparatus 3 has a first spline tooth portion 30 that is non-rotatable relative to the front differential case 212, a second spline tooth portion 31 that is non-rotatable relative to the ring gear 61, and a sleeve 32 that can be fitted to both the first and second spline tooth portions 30 and 31 by splines. The sleeve 32 can be advanced and retracted by an actuator (not shown) controlled by the control apparatus 10. That is, the driving force transmission and cut-off apparatus 3 is a dog clutch (meshing clutch) in which the first spline tooth portion 30 and the second spline tooth portion 31 are coupled together so as to be non-rotatable relative to each other to enable the driving force to be transmitted from the engine 202 to the propeller shaft 2.

With this configuration, the driving force transmission and cut-off apparatus 3 cuts off the transmission of the driving force from the engine 202 to the propeller shaft 2 in the two-wheel drive state, and enables the transmission of the driving force from the engine 202 to the propeller shaft 2 in the four-wheel drive state. The driving force transmission and cut-off apparatus 3 is an aspect of a transmission and cut-off mechanism of the present invention.

The driving force distribution apparatus 1 has a rear-wheel-side gear mechanism 11, a pair of hydraulic clutches 12A and 12B that adjusts the driving force transmitted by the gear mechanism 11 and transmits the adjusted driving force to the right and left axle shafts 213R and 213L, a case 13 in which the hydraulic clutches 12A and 12B and the gear mechanism 11 are housed, and a hydraulic unit 14 that supplies hydraulic oil to the hydraulic clutches 12A and 12B. The hydraulic unit 14 is controlled by the control apparatus 10. The control apparatus 10 is constituted of, for example, an electronic control unit (ECU).

The gear mechanism 11 includes a pinion gear 110 and a ring gear 111 serving as a bevel gear that mesh with each other, and a driving shaft 112 that rotates integrally with the ring gear 111. The driving shaft 112 has a rotating shaft extending in a vehicle width direction and rotates under a turning force of the ring gear 111. The hydraulic clutch 12A is disposed between the driving shaft 112 and the rear wheel 205L, and the hydraulic clutch 12B is disposed between the driving shaft 112 and the rear wheel 205R. The gear mechanism 11 transmits the driving force of the propeller shaft 2 to the hydraulic clutches 12A and 12B through the meshing between the pinion gear 110 and the ring gear 111.

In the four-wheel drive vehicle 200 configured as described above, in the two-wheel drive state, the transmission of the driving force from the engine 202 to the propeller shaft 2 is cut off by the driving force transmission and cut-off apparatus 3, and the transmission of the turning force from the rear wheels 205R and 205L to the propeller shaft 2 is cut off by the driving force distribution apparatus 1. Consequently, rotation of the propeller shaft 2 is stopped even while the four-wheel drive vehicle 200 is traveling. Thus, for example, lubricant stirring resistance in the gear mechanism 6 and the gear mechanism 11 is reduced.

When the four-wheel drive vehicle 200 is switched from the two-wheel drive state to the four-wheel drive state, the turning force of the rear wheels 205R and 205L is transmitted to the propeller shaft 2 via the driving force distribution apparatus 1 to rotate the propeller shaft 2. After synchronization of the driving force transmission and cut-off apparatus 3 is completed, the driving force transmission and cut-off apparatus 3 and the driving force distribution apparatus 1 are coupled together. Thus, the four-wheel drive vehicle 200 is in the four-wheel drive state.

The synchronization of the driving force transmission and cut-off apparatus 3 refers to a state where the rotation speed of an input-side rotating component (front differential case 212) is substantially the same as the rotation speed of an output-side rotating component (the ring gear 61 of the gear mechanism 6).

Figure 2:
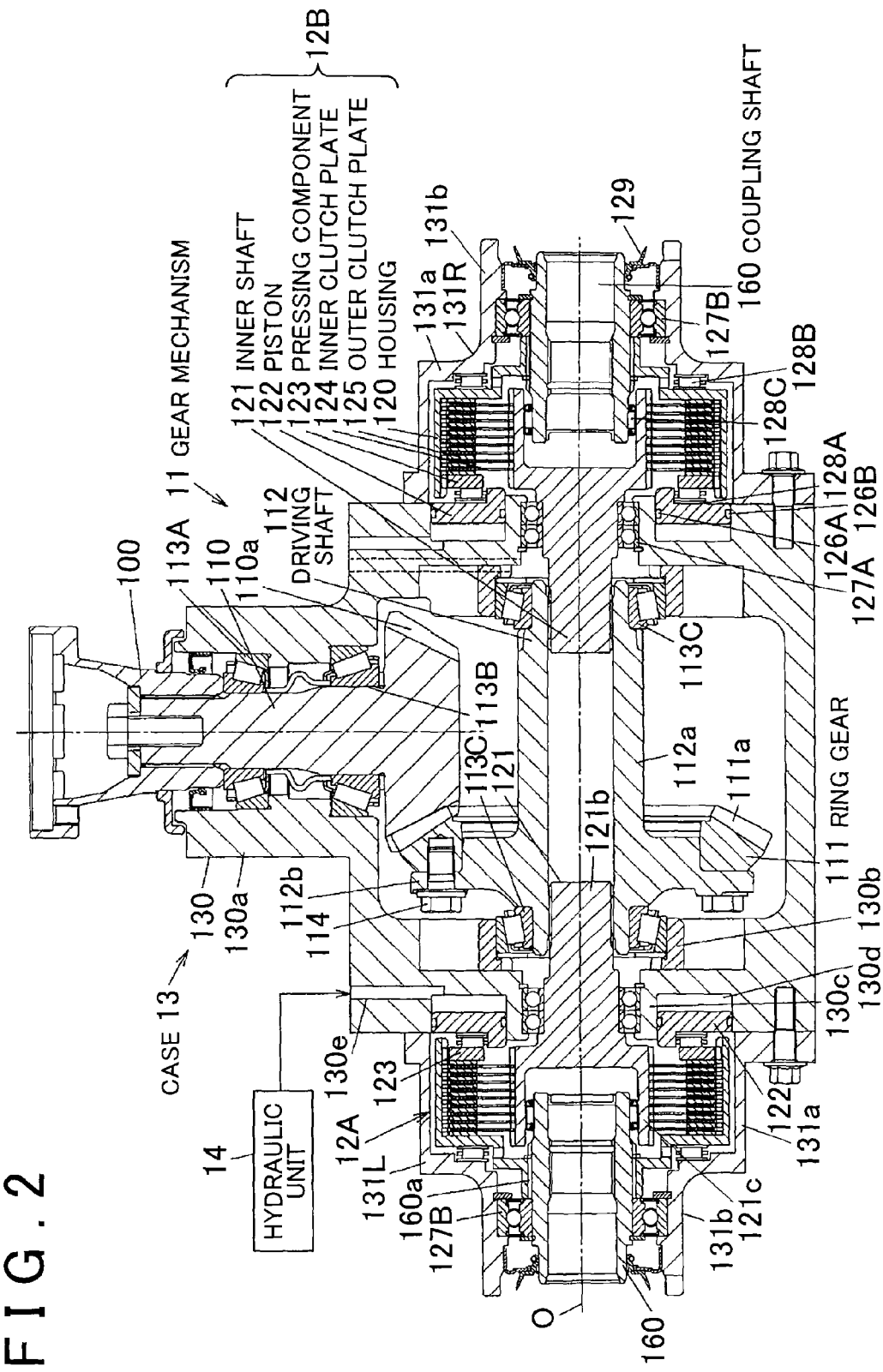
FIG. 2 is a sectional view depicting a configuration of a driving force distribution apparatus.
Figure 3:
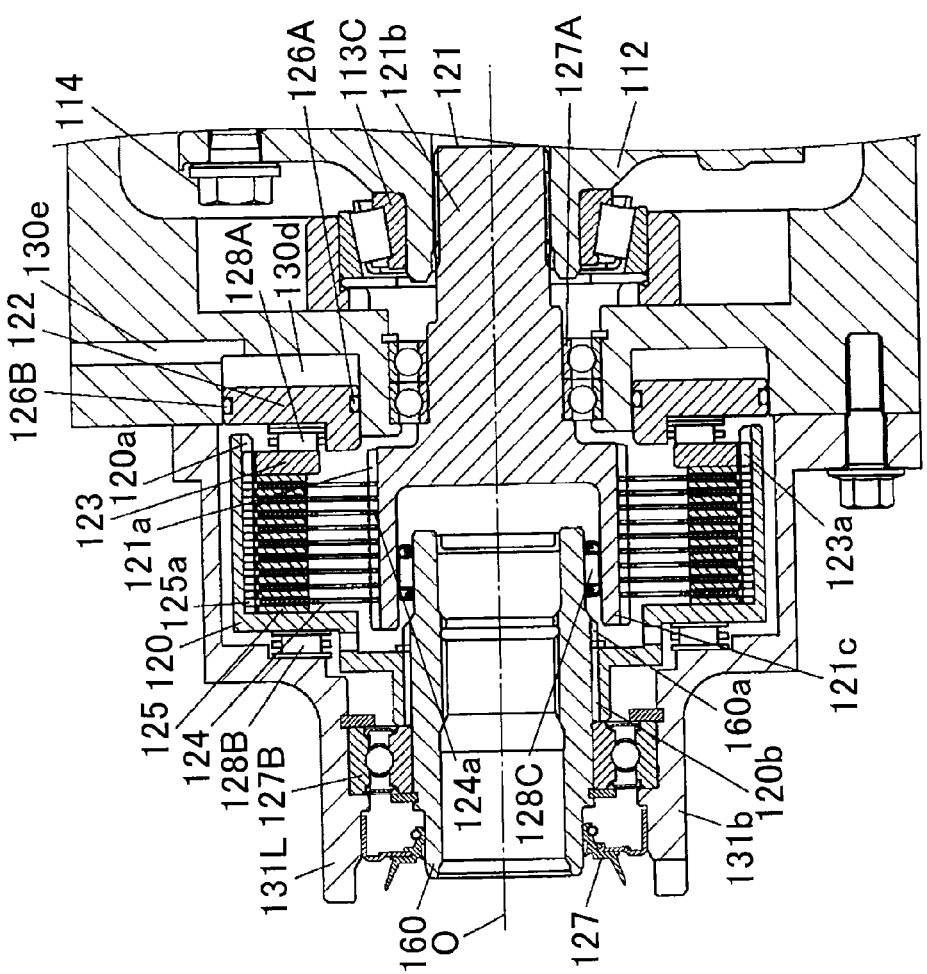
FIG. 3 is a sectional view of a main part depicting a configuration of a hydraulic clutch and a periphery of the hydraulic clutch.

FIG. 2 is a sectional view depicting a specific example of the internal structure of the case 13 of the driving force distribution apparatus 1. FIG. 3 is a sectional view of a main part depicting the hydraulic clutch 12A and a periphery of the hydraulic clutch 12A.

As depicted in FIG. 2, the driving force distribution apparatus 1 has the above-described gear mechanism 11, the pair of hydraulic clutches 12A and 12B, and the case 13. The pinion gear 110 of the gear mechanism 11 is coupled to the propeller shaft 2 by an intermediate shaft 100.

The case 13 includes a center case 130 that houses the pinion gear 110, the ring gear 111, and the driving shaft 112 of the gear mechanism 11 and side cases 131R and 131L that house the hydraulic clutches 12B and 12A, respectively. The center case 130 is disposed between the side case 131L located in the left of the vehicle and the side case 131R located in the right of the vehicle. The center case 130 and the side cases 131R and 131L are fixed together by being fastened together with bolts.

The center case 130 includes a first holding portion 130a that holds the pinion gear 110 of the gear mechanism 11 via tapered roller bearings 113A and 113B such that the pinion gear 110 is rotatable, second holding portions 130b that hold the driving shaft 112 of the gear mechanism 11 via tapered roller bearings 113C such that the driving shaft 112 is rotatable, third holding portions 130c that hold respective inner shafts 121 of the hydraulic clutches 12A and 12B such that the inner shafts 121 are rotatable via ball bearings 127A, housing portions 130d that serve as cylinders and that house respective pistons 122 described below such that the pistons 122 can be advanced and retracted. The housing portions 130d are provided on both ends of the center case 130 in the vehicle width direction and are open toward the side cases 131R and 131L.

The driving shaft 112 includes a cylindrical portion 112a and a flange portion 112b which are integrally formed. The cylindrical portion 112a has a cylindrical shape and extends along an axis of rotation O. The flange portion 112b protrudes radially outward from an end of the cylindrical portion 112a closer to the tapered roller bearing 113C. The ring gear 111 has a plurality of meshing teeth 111a which mesh with a gear portion 110a of the pinion gear 110. The ring gear 111 is fixed to the flange portion 112b of the driving shaft 112 with a bolt 114.

The side cases 131R and 131L each include: a housing portion 131a that houses a housing 120, the inner shaft 121, a pressing component 123, a plurality of inner clutch plates 124, and a plurality of outer clutch plates 125 that form the hydraulic clutch 12A and 12B, and a holding portion 131b that holds a coupling shaft 160 such that the coupling shaft 160 is rotatable via a ball bearing 127B. A gap between an inner peripheral surface of the holding portion 131b and an outer peripheral surface of the coupling shaft 160 at an outer end of each of the side cases 131R and 131L is sealed with a seal component 129.

The hydraulic clutches 12A and 12B have the same configuration, and each include the housing 120, the inner shaft 121 and the coupling shaft 160, the piston 122, the pressing component 123, the inner clutch plates 124, and the outer clutch plates 125. A lubricant is introduced into the housing 120 in order to facilitate frictional sliding of the inner clutch plates 124 and the outer clutch plates 125 on one another and to suppress wear. The hydraulic clutches 12A and 12B are housed in the side cases 131L and 131R, respectively, and positioned so as to sandwich the ring gear 111 between the hydraulic clutches 12A and 12B.

Each piston 122 can be advanced and retracted in the housing portion 130d of the center case 130 by hydraulic oil fed from the hydraulic unit 14. Supply channels 130e are formed in the center case 130 in order to supply the hydraulic oil fed from the hydraulic unit 14 to the pistons 122. Each piston 122 is constantly biased toward the gear mechanism 11 in a direction parallel to the axis of rotation O by a spring force of a return spring (not shown). Seal components 126A and 126B are provided on an inner peripheral surface and an outer peripheral surface, respectively, of each piston 122.

The hydraulic clutches 12A and 12B are actuated by the pressure of the hydraulic oil fed from the hydraulic unit 14. The hydraulic oil allows the inner clutch plates 124 and the outer clutch plates 125 to come into frictional contact with one another. The inner clutch plates 124 and the outer clutch plates 125 are disposed between the inner shaft 121 and the housing 120. The housing 120 is disposed coaxially with the inner shaft 121 so as to be rotatable relative to the inner shaft 121.

The inner clutch plates 124 and the outer clutch plates 125 receive an axial pressing force from the pressing component 123 to transmit the driving force between the inner shaft 121 and the housing 120. The inner clutch plates 124 and the outer clutch plates 125 are alternately disposed along the axis of rotation O of the inner shaft 121 and the coupling shaft 160, and are each formed of an annular frictional plate. The hydraulic clutch 12A allows frictional engagement of adjacent clutch plates of the inner clutch plates 124 and the outer clutch plates 125 and releases the frictional engagement to intermittently couple the housing 120 and the inner shaft 121 together.

As depicted in FIG. 3, each of the inner clutch plates 124 has straight spline fitting portions 124a in an inner peripheral portion of the inner clutch plate 124. The inner clutch plates 124 are coupled to the inner shaft 121 so as to be non-rotatable relative to the inner shaft 121 but to be movable in the axial direction, by fitting the straight spline fitting portions 124a into straight spline fitting portions 121a formed on an outer peripheral surface of the inner shaft 121.

Each of the outer clutch plates 125 has straight spline fitting portions 125a in an outer peripheral portion of the outer clutch plate 125. The outer clutch plates 125 are coupled to the housing 120 so as to be non-rotatable relative to the housing 120 but to be movable in the axial direction, by fitting the straight spline fitting portions 125a into straight spline fitting portions 120a of the housing 120.

When the pressing force corresponding to the hydraulic oil fed from the hydraulic unit 14 is applied to the piston 122, the inner clutch plates 124 and the outer clutch plates 125 receive the axial pressing force from the pressing component 123 and are frictionally engaged with one another. Thus, the hydraulic clutches 12A and 12B can transmit a torque. That is, the frictional engagement of the inner clutch plates 124 with the outer clutch plates 125 in the hydraulic clutches 12A and 12B enables the driving force from the engine 202 to be transmitted to the rear wheels 205L and 205R via the respective inner shafts 121 and the respective coupling shafts 160.

The pressing component 123 is formed of a ring-like plate material and has, in an outer peripheral surface thereof, straight spline fitting portions 123a that are fitted into the straight spline fitting portions 120a of the housing 120. The pressing component 123 is coupled to the housing 120 so as to be non-rotatable relative to the housing 120 but to be movable in the axial direction, by fitting the straight spline fitting portions 123a into the straight spline fitting portions 120a. The pressing component 123 is across a needle roller bearing 128A from the piston 122.

In the housing 120, spline fitting portions 120b are formed which are fitted into spline fitting portions 160a formed on an outer peripheral surface of the coupling shaft 160 by splines. Thus, the housing 120 is coupled to the coupling shaft 160 so as to be non-rotatable relative to the coupling shaft 160. Each housing 120 is also rotatably supported by the side case 131R and 131L via a needle roller bearing 128B.

Each inner shaft 121 has a shaft portion 121b and a cylindrical portion 121c, and an end of the shaft portion 121b is coupled by splines to the driving shaft 112 of the gear mechanism 11 so as to be non-rotatable relative to the driving shaft 112. A needle roller bearing 128C is disposed between an inner peripheral surface of the cylindrical portion 121c and the outer peripheral surface of the coupling shaft 160.

Figure 4:
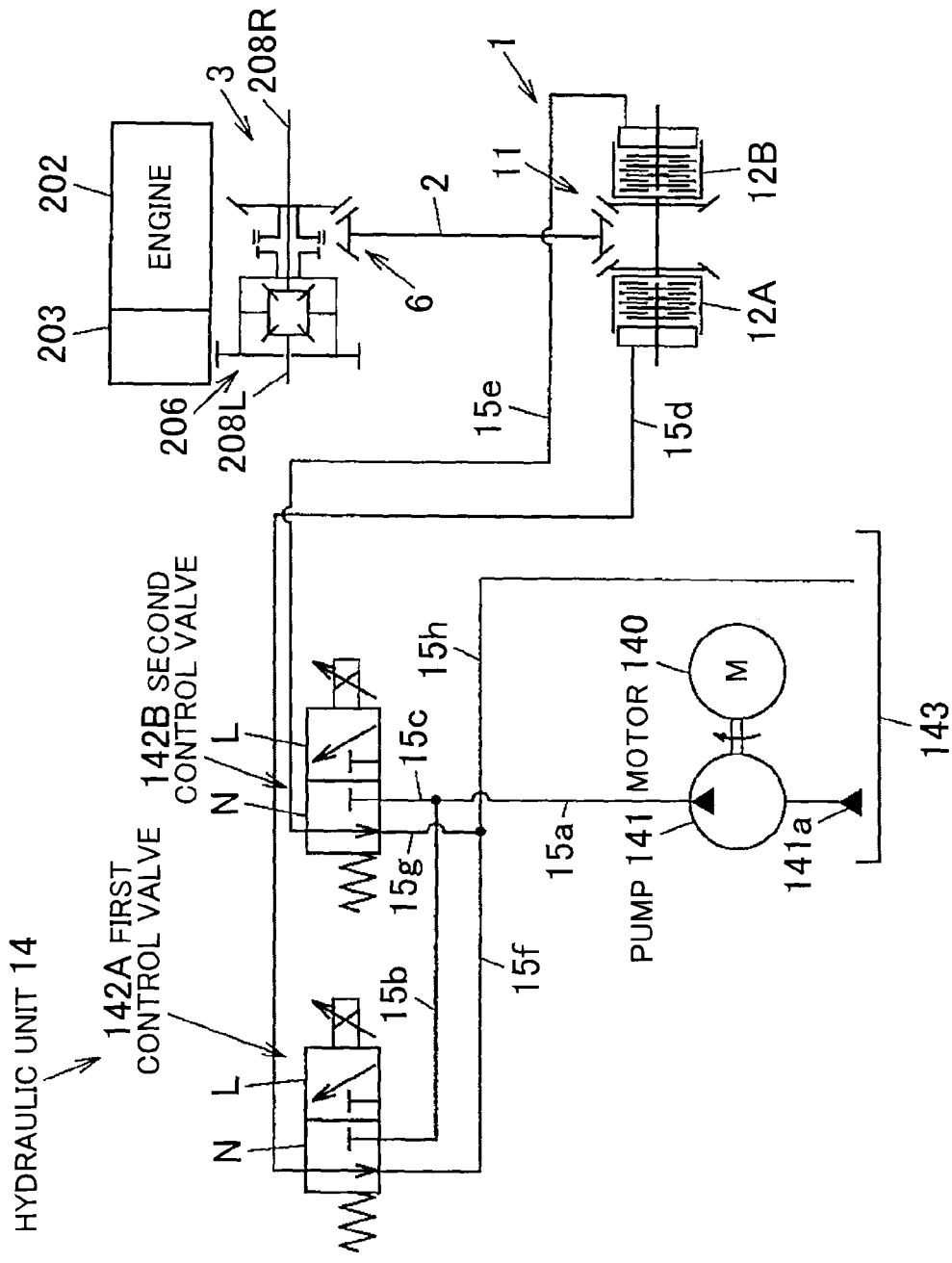
FIG. 4 is a circuit diagram depicting a hydraulic circuit including a hydraulic unit.

FIG. 4 depicts a hydraulic circuit including the hydraulic unit 14. In FIG. 4, illustration of the case 13 and the like is omitted. The hydraulic unit 14 includes a pump 141 serving as a single hydraulic pump and actuated by a motor 140 serving as an electric motor, and a first control valve 142A and a second control valve 142B in which valve opening degree can be adjusted according to the amount of current supplied by the control apparatus 10. The first control valve 142A is disposed between the pump 141 and the hydraulic clutch 12A to control the amount of hydraulic oil supplied to the hydraulic clutch 12A based on adjustment of the valve opening degree of the first control valve 142A. On the other hand, the second control valve 142B is disposed between the pump 141 and the hydraulic clutch 12B to control the amount of hydraulic oil supplied to the hydraulic clutch 12B based on adjustment of the valve opening degree of the second control valve 142B.

The hydraulic unit 14 also has a conduit 15a through which the hydraulic oil stored in an oil pan 143 is sucked through a suction port 141a and fed under pressure by the pump 141, a conduit 15b branching from the conduit 15a and leading to the first control valve 142A, a conduit 15c branching from the conduit 15a and leading to the second control valve 142B, a conduit 15d leading from the first control valve 142A to the hydraulic clutch 12A, and a conduit 15e leading from the second control valve 142B to the hydraulic clutch 12B.

The hydraulic unit 14 also has conduits 15f and 15g extending from the first control valve 142A and the second control valve 142B, respectively, returning toward the oil pan 143 and a conduit 15h into which the conduits 15f and 15g merge and which leads to the oil pan 143.

As the first control valve 142A and the second control valve 142B, for example, electromagnetic valves are used in which the opening degree of the valve is adjusted by moving a plunger (iron piece) by the magnetic force of a solenoid (electromagnet). That is, the first control valve 142A and the second control valve 142B are proportional control valves in which the valve opening degree changes in proportion to a current supplied by the control apparatus 10.

In the present embodiment, the first control valve 142A and the second control valve 142B allow two modes to be consecutively switched according to the amount of the current supplied by the control apparatus 10 as depicted in FIG. 4. A first mode is a supply mode L that enables the supply of the hydraulic oil from the pump 141 to the hydraulic clutches 12A and 12B. A second mode is a discharge mode N that enables the discharge of the hydraulic oil from the hydraulic clutches 12A and 12B into the oil pan 143. The discharge mode N is in a nonconductive state where the supply of the current from the control apparatus 10 is stopped. The state of the first control valve 142A and the second control valve 142B depicted in FIG. 4 corresponds to the discharge mode N.

The control apparatus 10 controls the hydraulic unit 14 such that, when the two-wheel drive state where the supply of the hydraulic oil to the hydraulic clutches 12A and 12B is cut off shifts to the four-wheel drive state where the hydraulic oil is supplied to the hydraulic clutches 12A and 12B, a higher priority is given to the supply of the hydraulic oil to the first hydraulic clutch 12A of the hydraulic clutches 12A and 12B than to the supply of the hydraulic oil to the second hydraulic clutch 12B. The control apparatus 10 performs this control to bring the inner clutch plates 124 and the outer clutch plates 125 in the first hydraulic clutch 12A into frictional contact with one another before bringing the inner clutch plates 124 and the outer clutch plates 125 in the second hydraulic clutch 12B into frictional contact with one another. The control sets the pressure at which the hydraulic oil is supplied to the first hydraulic clutch 12A higher than the pressure at which the hydraulic oil is supplied to the second hydraulic clutch 12B.

In the present embodiment, the hydraulic clutch 12A is disposed at a position where the ring gear 111 is sandwiched between the hydraulic clutch 12A and the pinion gear 110 (FIG. 2). That is, the control apparatus 10 gives a higher priority to the supply of the hydraulic oil to the hydraulic clutch 12A disposed on the opposite side to tooth flanks of the plurality of meshing teeth 111a of the ring gear 111 than to the supply of the hydraulic oil to the hydraulic clutch 12B. More specifically, the first control valve 142A is opened in advance of the second control valve 142B. The details of processing executed by the control apparatus 10 will be described with reference to FIG. 5A, 5B, and FIG. 6. In Graph A in FIG. 6, the valve opening degree of the first control valve 142A is depicted by a thick line, and the valve opening degree of the second control valve 142B is depicted by a thin line.

Figure 5A:
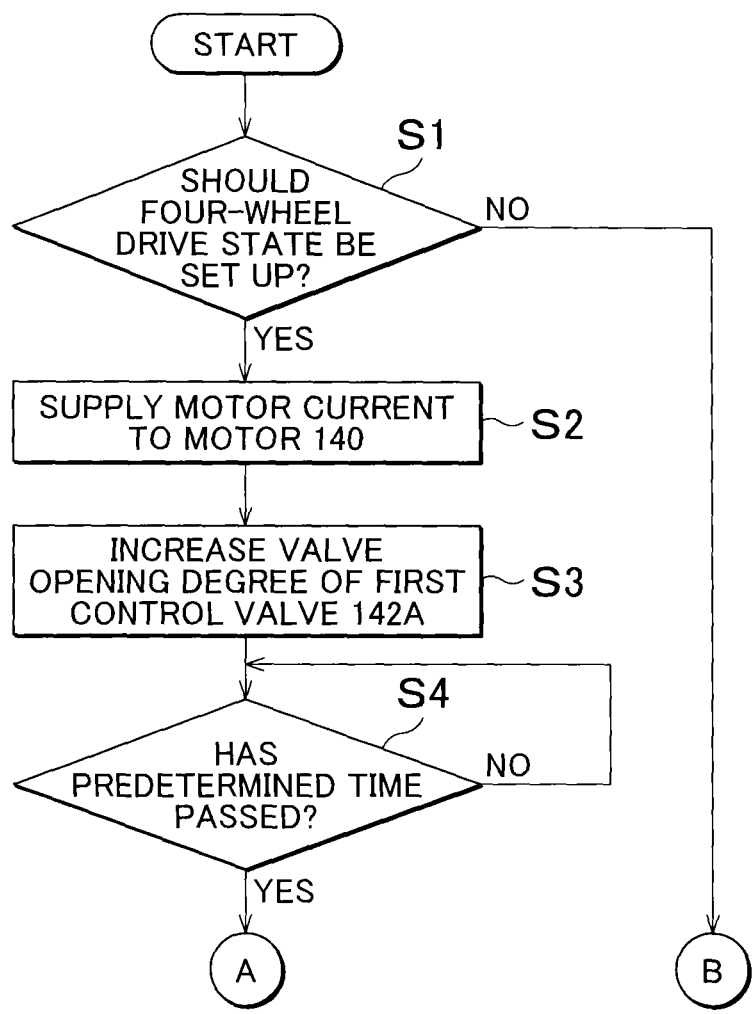
FIG. 5A is a flowchart illustrating a specific example of a process executed by a control apparatus according to the first embodiment of the present invention.
Figure 5B:
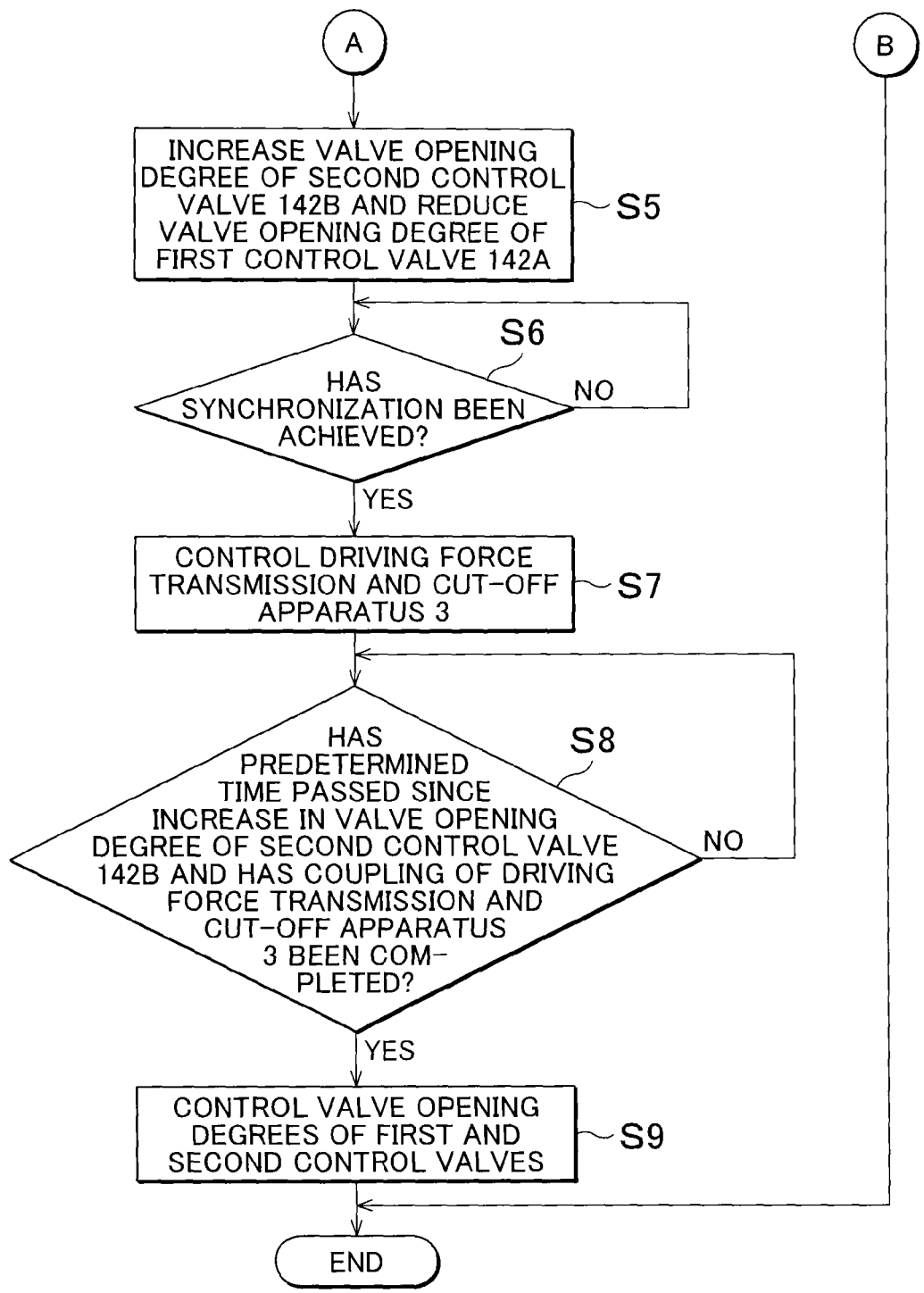
FIG. 5B is a flowchart illustrating a specific example of a process executed by a control apparatus according to the first embodiment of the present invention.
Figure 6:
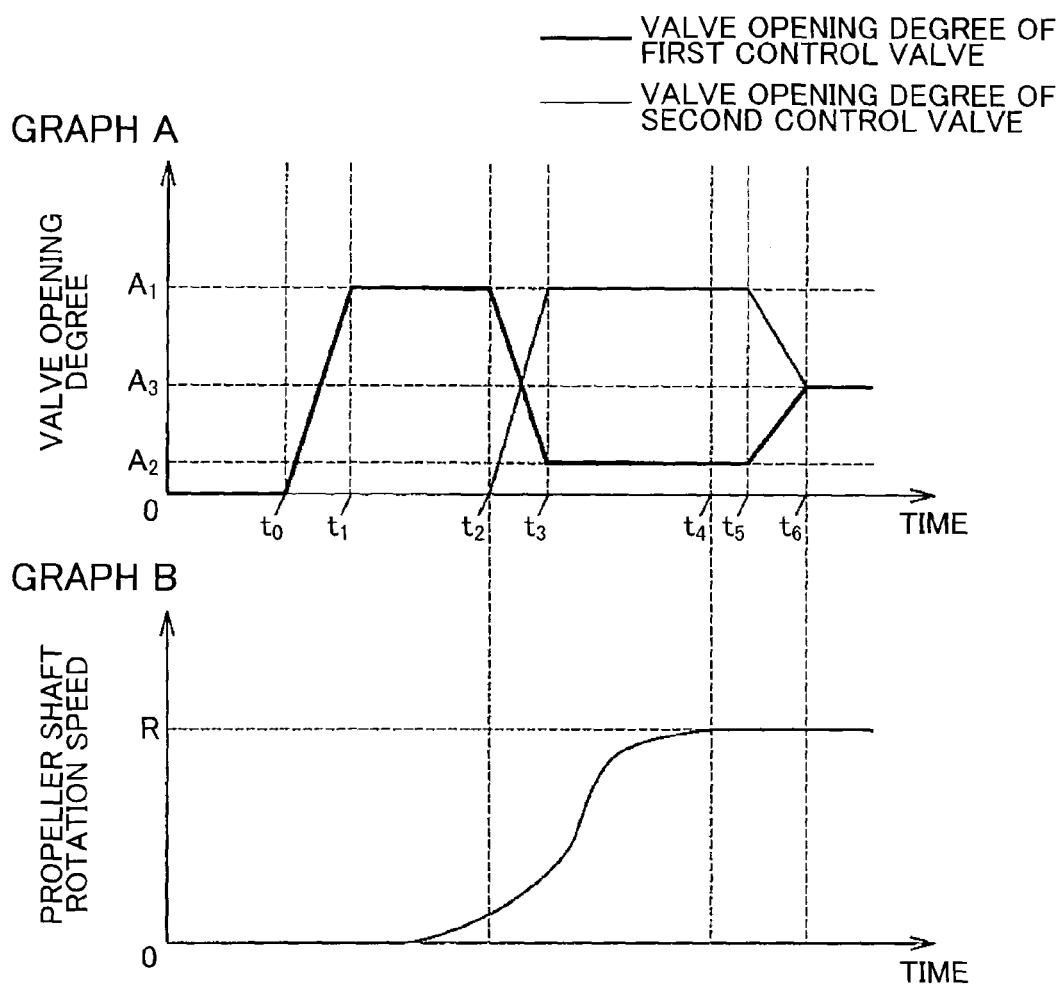
FIG. 6 shows Graphs A and B illustrating temporal changes resulting from execution of the process in the flowchart illustrated in FIG. 5A, 5B, Graph A illustrates temporal changes in the valve opening degrees of a first control valve and a second control valve, and Graph B illustrates temporal changes in the rotation speed of a propeller shaft.

FIG. 5A, 5B is a flowchart illustrating a specific example of one of the processes executed by the control apparatus 10 that is carried out to switch the four-wheel drive vehicle 200 from the two-wheel drive state to the four-wheel drive state. Graph A in FIG. 6 is a graph illustrating an example of temporal changes in the valve opening degrees of the first control valve 142A and the second control valve 142B observed when the process in the flowchart depicted in FIG. 5A, 5B is executed. Graph B in FIG. 6 is a graph illustrating temporal changes in the rotation speed of the propeller shaft.

The control apparatus 10 determines whether or not to perform switching from the two-wheel drive state to the four-wheel drive state (step S1). The determination can be made based on, for example, information on a driver's switch operation and a traveling state. Upon determining that the switching to the four-wheel drive state should not be executed (step S1: No), the control apparatus 10 ends the process without performing any control. It is assumed that, when processing in step S1 is executed, no current has been supplied to the hydraulic unit 14, the first control valve 142A and the second control valve 142B in the hydraulic unit 14 are in the discharge mode N (illustrated in FIG. 4), and the motor 140 is stopped.

On the other hand, upon determining that the switching to the four-wheel drive state should be executed (step S1: Yes), the control apparatus 10 supplies a motor current to the motor 140 for the hydraulic unit 14 (step S2), and supplies a current to the first control valve 142A to increase the valve opening degree (step S3). Thus, the first control valve 142A shifts from the discharge mode N to the supply mode L to actuate the pump 141 to pump up the hydraulic oil stored in the oil pan 143. The hydraulic oil pumped up by the pump 141 is then fed under pressure to the first control valve 142A via the conduits 15a and 15b and then fed to the piston 122 in the hydraulic clutch 12A via the conduit 15d.

Execution of processing in steps S2 and S3 is started at time t0 depicted in FIG. 6. The valve opening degree of the first control valve 142A increases according to the current supplied by the control apparatus 10, and at time t1, reaches A1 at which the valve is fully open.

The piston 122 applies a pressing force to the hydraulic clutch 12A corresponding to the fed hydraulic oil, so that gaps between the inner clutch plates 124 and the outer clutch plates 125 are narrowed, and the inner clutch plates 124 and the outer clutch plates 125 get into frictional contact with one another. The frictional contact refers to contact resulting from pressing by a force that allows a frictional force to be exerted.

The frictional contact between the inner clutch plates 124 and the outer clutch plates 125 causes a torque to be transmitted from the axle shaft 213L to the propeller shaft 2 via the hydraulic clutch 12A. The propeller shaft 2 thus starts to rotate and gradually increases in speed. That is, in shifting the two-wheel drive state to the four-wheel drive state, the control apparatus 10 brings the inner clutch plates 124 and the outer clutch plates 125 in the hydraulic clutch 12A into frictional contact with one another to rotate and accelerate the propeller shaft 2.

Next, the control apparatus 10 waits for a predetermined time to pass since the supply of the current to the first control valve 142A (step S4). When the predetermined time has passed (step S4: Yes), the control apparatus 10 starts supplying a current to the second control valve 142B, while simultaneously reducing the current supplied to the first control valve 142A. Thus, the second control valve 142B is switched from the discharge mode N to the supply mode L to increase the valve opening degree of the second control valve 142B, with the valve opening degree of the first control valve 142A reduced (step S5).

The predetermined time in step S4 is set to be the minimum duration from the supply of the current to the first control valve 142A until the gaps between the inner clutch plates 124 and the outer clutch plates 125 are narrowed and a frictional torque needed to rotate the propeller shaft 2 is produced.

Execution of processing in step S5 is started at time t2 in Graph A in FIG. 6. The valve opening degree of the first control valve 142A decreases as the current supplied from the control apparatus 10 decreases, and the valve opening degree reaches A2 at time t3. The valve opening degree A2 is the minimum valve opening degree needed to maintain a state where the propeller shaft 2 is rotated via the gear mechanism 11 due to the frictional contact between the inner clutch plates 124 and the outer clutch plates 125 in the hydraulic clutch 12A.

On the other hand, the valve opening degree of the second control valve 142B increases according to the current supplied from the control apparatus 10, and at time t3, reaches A1 at which the valve is fully open. Accordingly, the hydraulic oil stored in the oil pan 143 is fed under pressure to the second control valve 142B via the conduits 15a and 15c and also fed to the piston 122 in the hydraulic clutch 12B via the conduit 15e. Thus, gaps between the inner clutch plates 124 and the outer clutch plates 125 in the hydraulic clutch 12B are narrowed to bring the inner clutch plates 124 and the outer clutch plates 125 into frictional contact with one another.

That is, the control apparatus 10 performs control such that the first control valve 142A is opened before the second control valve 142B is opened to bring the inner clutch plates 124 and the outer clutch plates 125 in the hydraulic clutch 12A of the pair of hydraulic clutches 12A and 12B into frictional contact with one another, and that the hydraulic oil is then supplied to the hydraulic clutch 12B thereafter. The control apparatus 10 also performs, in parallel, the rotational synchronization of the first spline tooth portion 30 with the second spline tooth portion 31 based on acceleration of the propeller shaft 2 and the supply of the hydraulic oil to the hydraulic clutch 12B.

The control apparatus 10 then determines whether or not the driving force transmission and cut-off apparatus 3 has been synchronized, that is, whether or not the rotation speeds of the first spline tooth portion 30 and the second spline tooth portion 31 are equal enough to allow the first spline tooth portion 30 and the second spline tooth portion 31 to be coupled together using the sleeve 32 so as to be non-rotatable relative to each other (step S6). This determination can be made by, for example, comparing the rotation speed of the ring gear 61 of the gear mechanism 6 with the rotation speed of the front differential case 212. If the result of the determination indicates that the driving force transmission and cut-off apparatus 3 has not been synchronized (step S6: No), the determination process in step S6 is repeatedly executed. If the driving force transmission and cut-off apparatus 3 has been synchronized (step S6: Yes), the control apparatus 10 outputs a command current value to the driving force transmission and cut-off apparatus 3 to control the driving force transmission and cut-off apparatus 3 to be in a coupled state (step S7).

Processing in step S7 is executed at time t4 in Graph A in FIG. 6 to set the rotation speed of the propeller shaft 2 equal to a rotation speed R needed to synchronize the driving force transmission and cut-off apparatus 3. The control apparatus 10 then performs control such that the propeller shaft 2 and the front differential case 212 are coupled together by the driving force transmission and cut-off apparatus 3 and that the driving force of the engine 202 can be transmitted to the driving force distribution apparatus 1 via the propeller shaft 2.

Next, in step S5, the control apparatus 10 waits for a predetermined time to pass since an increase in the valve opening degree of the second control valve 142B and also waits for the completion of coupling of the first spline tooth portion 30 and the second spline tooth portion 31 in the driving force transmission and cut-off apparatus 3 (step S8). When both of these conditions are met (step S8: Yes), the control apparatus 10 controls the valve opening degrees of the first control valve 142A and the second control valve 142B so as to allow the driving force distribution apparatus 1 to generate a torque needed in the four-wheel drive state (step S9).

The determination of whether or not the coupling in the driving force transmission and cut-off apparatus 3 has been completed may be made based on the result of detection of the position of the sleeve 32. The predetermined time in step S8 is a time defined taking into account the amount of time from the start of supply of a current to the second control valve 142B until a sufficient amount of hydraulic oil is supplied to the hydraulic clutch 12B.

The valve opening degree in step S9 is determined by the control apparatus 10 executing calculation based on the vehicle traveling state. The vehicle traveling state includes, for example, the difference between the rotation speed of the front wheels 204R and 204L and the rotation speed of the rear wheels 205R and 205L, vehicle speed, steering angle, and the amount by which the driver steps on an accelerator pedal (the amount of acceleration operation).

Processing in step S9 is executed at time t5 in Graph A in FIG. 6. The valve opening degrees of the first control valve 142A and the second control valve 142B both reach A3 at time t6. The valve opening degree A3 is a valve opening degree corresponding to a transmission torque to be generated by the hydraulic clutches 12A and 12B to allow the four-wheel drive vehicle 200 to travel in the four-wheel drive state. Thus, at time t6, the shifting of the four-wheel drive vehicle 200 to the four-wheel drive state is completed.

The above-described first embodiment produces advantageous effects described below.

(1) In shifting the two-wheel drive state to the four-wheel drive state, the control apparatus 10 for the four-wheel drive vehicle 200 performs control such that the supply of the hydraulic oil to the hydraulic clutch 12A precedes the supply of the hydraulic oil to the hydraulic clutch 12B. Consequently, the inner clutch plates 124 and the outer clutch plates 125 in the hydraulic clutch 12A can be more quickly brought into frictional contact with one another than the case where the hydraulic clutches 12A and 12B are simultaneously supplied with the hydraulic oil. In other words, the hydraulic oil discharged from the pump 141 is intensively supplied to the hydraulic clutch 12A to allow the turning force of the rear wheels 205R and 205L to be more quickly transmitted to the propeller shaft 2 via the hydraulic clutch 12A. Thus, the hydraulic clutches 12A and 12B can be kept responsive even when gaps between the inner clutch plates 124 and the outer clutch plates 125 are secured in an uncoupled state of the hydraulic clutches 12A and 12B such that the gaps are large enough to sufficiently reduce drag torque. That is, the responsiveness to switching from the two-wheel drive state to the four-wheel drive state can be enhanced with an increase in drag torque suppressed.

(2) The control apparatus 10 controls the hydraulic unit 14 such that a higher priority is given to the supply of the hydraulic oil to the hydraulic clutch 12A disposed on the opposite side to the tooth flanks of the meshing teeth 111a of the ring gear 111 than to the supply of the hydraulic oil to the hydraulic clutch 12B. This allows the traveling state of the four-wheel drive vehicle 200 to be stabilized compared to a case where the hydraulic oil is preferentially supplied to the hydraulic clutch 12B. In other words, if a higher priority is given to the supply of the hydraulic oil to the hydraulic clutch 12B than to the supply of the hydraulic oil to the hydraulic clutch 12A, operation of the hydraulic clutch 12B causes a braking effect to be exerted on the right rear wheel 205R, which produces a yaw moment in a direction in which the four-wheel drive vehicle 200 turns rightward. Furthermore, the propeller shaft 2 receives a rotational torque via the hydraulic clutch 12B to rotate, which produces a roll moment in the counterclockwise direction about the propeller shaft 2 when the four-wheel drive vehicle 200 is viewed from the front. Both the yaw moment and the roll moment act to turn the four-wheel drive vehicle 200 rightward and may thus make the traveling state of the four-wheel drive vehicle 200 unstable. However, according to the present embodiment, the four-wheel drive vehicle 200 is subjected to a yaw moment in a direction in which the four-wheel drive vehicle 200 turns leftward and a roll moment in the counterclockwise direction about the propeller shaft 2. The yaw moment and the roll moment act in directions in which the moments offset each other. This allows the traveling state to be made more stable.

Now, a second embodiment of the present invention will be described with reference to FIG. 7A, 7B and FIG. 8. The present embodiment is different from the first embodiment in the contents of the processing executed by the control apparatus 10. The configurations of the driving force distribution apparatus 1, the hydraulic unit 14, and the like in the present embodiment are the same as the configurations of the same components described in the first embodiment with reference to FIGS. 1 to 4.

Figure 7A:
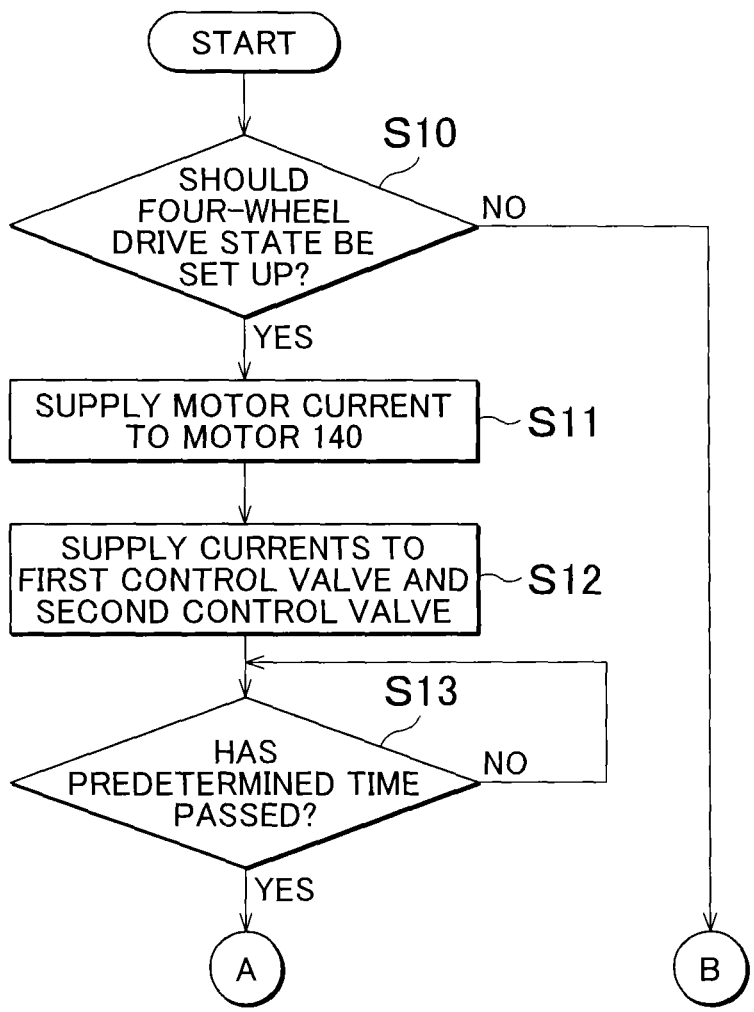
FIG. 7A is a flowchart illustrating a specific example of a process executed by a control apparatus according to a second embodiment of the present invention.
Figure 7B:
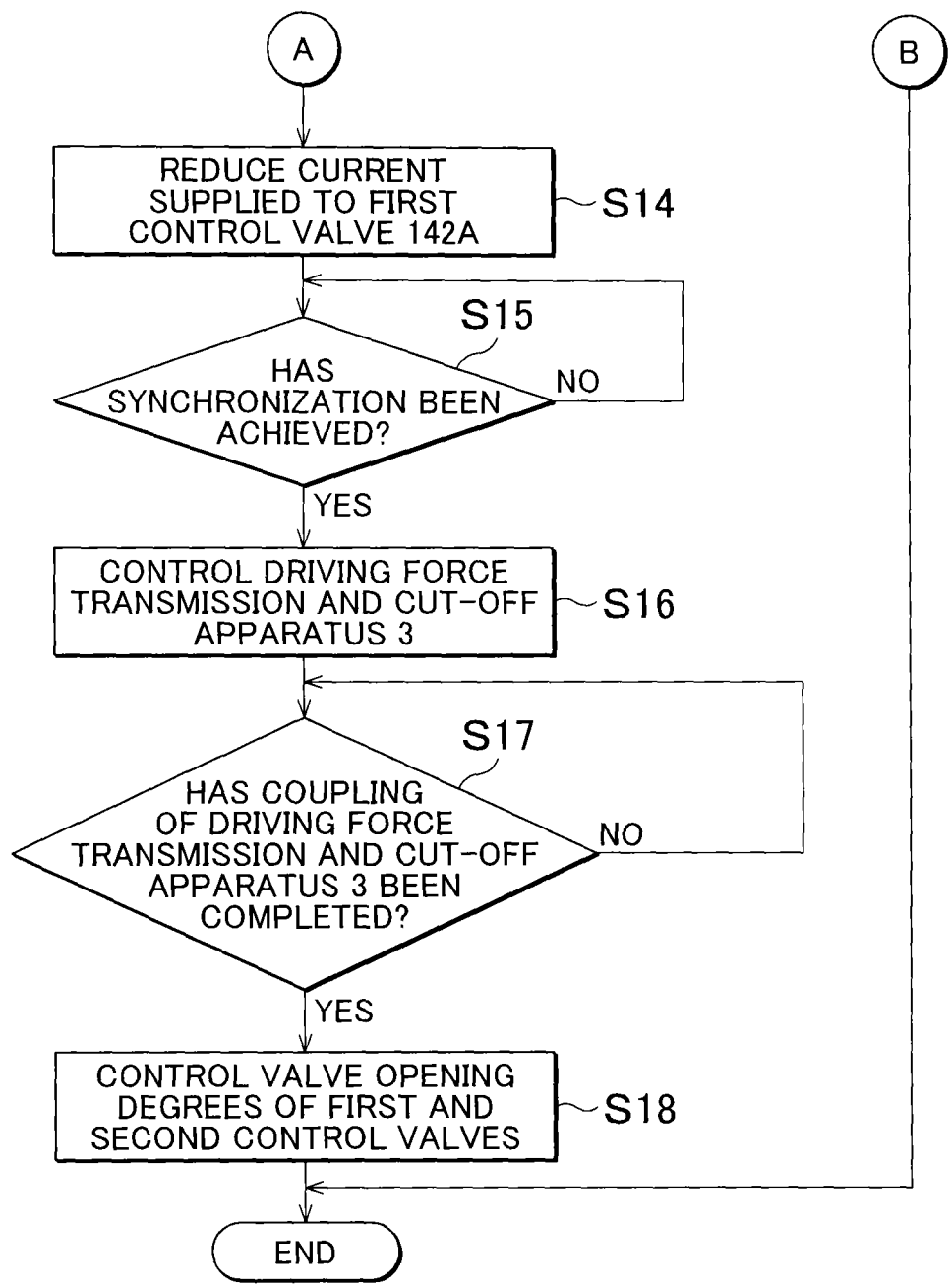
FIG. 7B is a flowchart illustrating a specific example of a process executed by a control apparatus according to a second embodiment of the present invention.

FIG. 7A, 7B is a flowchart illustrating a specific example of one of the processes executed by the control apparatus 10 according to the present embodiment that is carried out to switch the four-wheel drive vehicle 200 from the two-wheel drive state to the four-wheel drive state. Graph A in FIG. 8 is a graph illustrating an example of temporal changes in the valve opening degrees of the first control valve 142A and the second control valve 142B observed when the process in the flowchart depicted in FIG. 5A, 5B is executed. Graph B in FIG. 8 is a graph illustrating temporal changes in the rotation speed of the propeller shaft.

In the first embodiment, the case has been described where the control apparatus 10 opens the first control valve 142A before opening the second control valve 142B so as to give a higher priority to the supply of the hydraulic oil to the hydraulic clutch 12A than to the supply of the hydraulic oil to the hydraulic clutch 12B. However, in the present embodiment, a case will be described where, when the two-wheel drive state is shifted to the four-wheel drive state, the amount of hydraulic oil supplied to the hydraulic clutch 12A is set larger than the amount of hydraulic oil supplied to the hydraulic clutch 12B and thereby a higher priority is given to the supply of the hydraulic oil to the hydraulic clutch 12A than to the supply of the hydraulic oil to the hydraulic clutch 12B.

The description below uses the same names and reference numerals of the components of the four-wheel drive vehicle 200, the driving force distribution apparatus 1, and the hydraulic unit 14 described for the first embodiment with reference to FIGS. 1 to 4.

The control apparatus 10 determines whether or not to switch from the two-wheel drive state to the four-wheel drive state (step S10). This determination may be based on, for example, information on the driver's switch operation and the traveling state as is the case with the processing in step S1 in the flowchart in FIG. 5A, 5B for the first embodiment.

Upon determining that the switching to the four-wheel drive state should not be executed (step S10: No), the control apparatus 10 ends the process without performing any control. On the other hand, upon determining that the switching to the four-wheel drive state should be executed (step S10: Yes), the control apparatus 10 supplies a motor current to the motor 140 (step S11) and supplies currents to the first control valve 142A and the second control valve 142B (step S12). Note that the current supplied to the second control valve 142B is smaller than the current supplied to the first control valve 142A, and the valve opening degree of the second control valve 142B is lower than the valve opening degree of the first control valve 142A.

Thus, the first control valve 142A and the second control valve 142B shift from the discharge mode N to the supply mode L to actuate the pump 141, which pumps up the hydraulic oil stored in the oil pan 143. The hydraulic oil pumped up by the pump 141 is then fed under pressure to the first control valve 142A via the conduits 15*a* and 15*b* and fed to the piston 122 in the hydraulic clutch 12A via the conduit 15*d*. Furthermore, hydraulic oil the amount of which is smaller than that of hydraulic oil fed to the hydraulic clutch 12A is fed to the second control valve 142B via the conduits 15*a* and 15*c* and fed to the piston 122 in the hydraulic clutch 12B via the conduit 15*e*.

Figure 8:
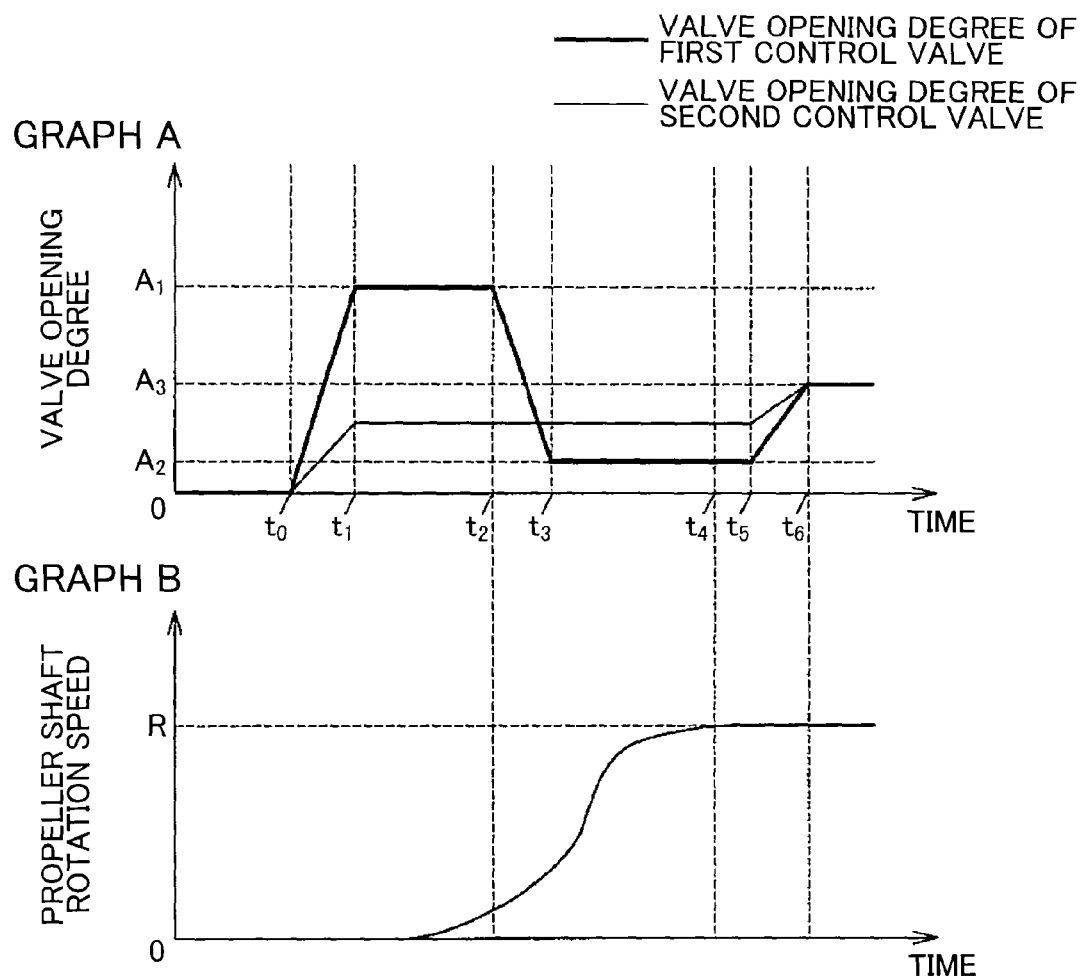
FIG. 8 shows Graphs A and B illustrating temporal changes resulting from execution of the process in the flowchart illustrated in FIG. 7A, 7B, Graph A illustrates temporal changes in the valve opening degrees of a first control valve and a second control valve, and Graph B illustrates temporal changes in the rotation speed of a propeller shaft.

Processing in steps S11 and S12 is executed at time t0 depicted in FIG. 8. The valve opening degree of the first control valve 142A increases according to the current supplied by the control apparatus 10, and at time t1, reaches A1 at which the valve is fully open. In parallel with this, the valve opening degree of the second control valve 142B increases according to the current supplied by the control apparatus 10, and at time t1, reaches a predetermined valve opening degree that is lower than A1. In the present embodiment, the valve opening degree of the second control valve 142B at time t1 is higher than the valve opening degree A2 in the first embodiment and is lower than the valve opening degree A1 at which the valve is fully open. However, in yet another embodiment, the valve opening degree of the second control valve 142B at time t1 may be equivalent to or lower than A2.

Then, the control apparatus 10 waits for a predetermined time to pass since the supply of the currents to the first control valve 142A and the second control valve 142B (step S13). When the predetermined time has passed (step S13: Yes), the control apparatus 10 reduces the current supplied to the first control valve 142A while maintaining the current supplied to the second control valve 142B (step S14). Thus, the valve opening degree of the first control valve 142A reaches A2 (the minimum valve opening degree needed to maintain the state where the propeller shaft 2 is rotated due to the frictional contact between the inner clutch plates 124 and the outer clutch plates 125).

The predetermined time in step S13 is set to be the minimum duration from the supply of the currents to the first control valve 142A and the second control valve 142B until the gaps between the inner clutch plates 124 and the outer clutch plates 125 are narrowed and a frictional torque needed to rotate the propeller shaft 2 is produced.

Processing in step S14 is executed at time t2 depicted in Graph A in FIG. 8. The valve opening degree of the first control valve 142A decreases as the current supplied from the control apparatus 10 decreases, and reaches A2 at time t3.

Next, the control apparatus 10 then determines whether or not the driving force transmission and cut-off apparatus 3 has been synchronized (step S5). If the result of the determination indicates that the driving force transmission and cut-off apparatus 3 has not been synchronized (step S15: No), the determination process in step S15 is repeatedly executed. If the driving force transmission and cut-off apparatus 3 has been synchronized (step S15: Yes), the control apparatus 10 outputs a command current value to the driving force transmission and cut-off apparatus 3 to control the driving force transmission and cut-off apparatus 3 to be in the coupled state (step S16).

Processing in step S16 is executed at time t4 depicted in Graph A in FIG. 8 to set the rotation speed of the propeller shaft 2 equal to the rotation speed R needed to synchronize the driving force transmission and cut-off apparatus 3. The control apparatus 10 then performs control such that the propeller shaft 2 and the front differential case 212 are coupled together by the driving force transmission and cut-off apparatus 3 and that a driving force can be transmitted. In this state, the driving force of the engine 202 can be transmitted to the driving force distribution apparatus 1 via the propeller shaft 2. That is, also in the present embodiment, the control apparatus 10 performs, in parallel, the rotational synchronization of the driving force transmission and cut-off apparatus 3 based on the acceleration of the propeller shaft 2 and the supply of the hydraulic oil to the hydraulic clutch 12B.

The control apparatus 10 then waits for the completion of coupling of the first spline tooth portion 30 and the second spline tooth portion 31 in the driving force transmission and cut-off apparatus 3 (step S17). If the coupling has been completed (step S17: Yes), the control apparatus 10 controls the valve opening degrees of the first control valve 142A and the second control valve 142B so as to allow the driving force distribution apparatus 1 to generate a torque needed in the four-wheel drive state (step S18).

Processing in step S18 is executed at time t5 depicted in Graph A in FIG. 8. The valve opening degrees of the first control valve 142A and the second control valve 142B both reach A3 at time t6. The valve opening degree A3 is a valve opening degree corresponding to a transmission torque to be generated by the hydraulic clutches 12A and 12B to allow the four-wheel drive vehicle 200 to travel in the four-wheel drive state. Thus, at time t6, the shifting of the four-wheel drive vehicle 200 to the four-wheel drive state is completed.

According to the present embodiment, when the two-wheel drive state is shifted to the four-wheel drive state, the amount of hydraulic oil supplied to the hydraulic clutch 12A is set larger than the amount of hydraulic oil supplied to the hydraulic clutch 12B to give a higher priority to the supply of the hydraulic oil to the hydraulic clutch 12A than to the supply of the hydraulic oil to the hydraulic clutch 12B. Thus, the present embodiment allows the inner clutch plates 124 and the outer clutch plates 125 in the hydraulic clutch 12A to come into frictional contact with one another more quickly than a case where, for example, the same amount of hydraulic oil is simultaneously supplied to the hydraulic clutches 12A and 12B. Consequently, the hydraulic clutches 12A and 12B can be kept responsive even when gaps between the inner clutch plates 124 and the outer clutch plates 125 are secured in the uncoupled state of the hydraulic clutches 12A and 12B such that the gaps are large enough to sufficiently reduce drag torque. That is, the responsiveness to switching from the two-wheel drive state to the four-wheel drive state can be enhanced with an increase in drag torque suppressed.

The control apparatus for the four-wheel drive vehicle and the method for controlling the four-wheel drive vehicle have been described based on the embodiments. However, the present invention is not limited to the above-described embodiments and may be implemented in various forms without departing from the spirits of the invention.

For example, in the present embodiment, the ring gear 111 is disposed at a position sandwiched between the hydraulic clutch 12A and the pinion gear 110, but the ring gear 111 may be disposed at a position sandwiched between the hydraulic clutch 12B and the pinion gear 110. In this case, effects similar to the effects of the above-described embodiments can be produced when the control apparatus 10 controls the hydraulic unit 14 such that a higher priority is given to the supply of the hydraulic oil to the hydraulic clutch 12B than to the supply of the hydraulic oil to the hydraulic clutch 12A.

What is claimed is:

1. A four-wheel drive vehicle that enables switching between a four-wheel drive state where a driving force of a driving source is transmitted to a pair of right and left main driving wheels and a pair of right and left auxiliary driving wheels and a two-wheel drive state where the driving force of the driving source is transmitted only to the main driving wheels, the four-wheel drive vehicle comprising:
a propeller shaft that transmits the driving force of the driving source to the auxiliary driving wheels in the four-wheel drive state;
a transmission and cut-off mechanism that cuts off transmission of the driving force from the driving source to the propeller shaft in the two-wheel drive state and that enables transmission of the driving force from the driving source to the propeller shaft in the four-wheel drive state;
a driving shaft that rotates under a turning force of the propeller shaft and that has a central axis extending in a vehicle width direction;
a pair of hydraulic clutches each disposed between the driving shaft and a corresponding one of the auxiliary driving wheels and having a plurality of clutch plates that enable the driving force to be frictionally transmitted;
a hydraulic unit that supplies hydraulic oil to the hydraulic clutches and that brings the clutch plates into frictional contact with one another using the hydraulic oil; and
a control apparatus that controls the hydraulic unit, wherein,
in shifting the two-wheel drive state to the four-wheel drive state, the control apparatus supplies the hydraulic oil to a first hydraulic clutch of the pair of hydraulic clutches and subsequently supplies the hydraulic oil to a second hydraulic clutch of the pair of hydraulic clutches.

2. The four-wheel drive vehicle according to claim 1, wherein,
the hydraulic unit includes a single hydraulic pump that is actuated by an electric motor, and a first control valve and a second control valve that allow valve opening degrees thereof to be adjusted according to an amount of current from the control apparatus, the first control valve is configured to control an amount of hydraulic oil supplied to the first hydraulic clutch, and the second control valve is configured to control an amount of hydraulic oil supplied to the second hydraulic clutch, and
in shifting the two-wheel drive state to the four-wheel drive state, the control apparatus opens the first control valve in advance of the second control valve.

3. The four-wheel drive vehicle according to claim 1, wherein,
in shifting the two-wheel drive state to the four-wheel drive state, the control apparatus brings the clutch plates in the first hydraulic clutch into frictional contact with one another to rotate the propeller shaft.

4. The four-wheel drive vehicle according to claim 2, wherein,
in shifting the two-wheel drive state to the four-wheel drive state, the control apparatus brings the clutch plates in the first hydraulic clutch into frictional contact with one another to rotate the propeller shaft.

5. The four-wheel drive vehicle according to claim 3, wherein,
the transmission and cut-off mechanism comprises a meshing clutch having a first spline tooth portion and a second spline tooth portion coupled together so as to be non-rotatable relative to each other to enable transmission of the driving force from the driving source to the propeller shaft, and
the control apparatus performs, in parallel, rotational synchronization of the first spline tooth portion and the second spline tooth portion based on acceleration of the propeller shaft and supply of the hydraulic oil to the second hydraulic clutch, wherein,
the acceleration of the propeller shaft is performed by the hydraulic clutch transmitting the driving force.

6. The four-wheel drive vehicle according to claim 3, wherein,
in shifting the two-wheel drive state to the four-wheel drive state, the control apparatus sets an amount of hydraulic oil supplied to the first hydraulic clutch of the pair of hydraulic clutches larger than an amount of hydraulic oil supplied to the second hydraulic clutch of the pair of hydraulic clutches.

7. The four-wheel drive vehicle according to claim 5, wherein,
in shifting the two-wheel drive state to the four-wheel drive state, the control apparatus sets an amount of hydraulic oil supplied to the first hydraulic clutch of the pair of hydraulic clutches larger than an amount of hydraulic oil supplied to the second hydraulic clutch of the pair of hydraulic clutches.

8. The four-wheel drive vehicle according to claim 3, wherein,
in shifting the two-wheel drive state to the four-wheel drive state, the control apparatus sets a pressure of hydraulic oil supplied to the first hydraulic clutch of the pair of hydraulic clutches higher than a pressure of hydraulic oil supplied to the second hydraulic clutch of the pair of hydraulic clutches.

9. The four-wheel drive vehicle according to claim 5, wherein,
in shifting the two-wheel drive state to the four-wheel drive state, the control apparatus sets a pressure of hydraulic oil supplied to the first hydraulic clutch of the pair of hydraulic clutches higher than a pressure of hydraulic oil supplied to the second hydraulic clutch of the pair of hydraulic clutches.

10. The four-wheel drive vehicle according to claim 1, wherein,
the driving shaft receives a turning force of the propeller shaft via a bevel gear that rotates integrally with the driving shaft, and
the hydraulic clutches are disposed to sandwich the bevel gear between the hydraulic clutches in the vehicle width direction, and the control apparatus controls the hydraulic unit such that the hydraulic oil is supplied to the first hydraulic clutch and subsequently supplied-to the second hydraulic clutch, the first hydraulic clutch disposed on an opposite side to a tooth flank of the bevel gear with the bevel gear therebetween.

11. The four-wheel drive vehicle according to claim 6, wherein,
the driving shaft receives a turning force of the propeller shaft via a bevel gear that rotates integrally with the driving shaft, and
the hydraulic clutches are disposed to sandwich the bevel gear between the hydraulic clutches in the vehicle width direction, and the control apparatus controls the hydraulic unit such that the hydraulic oil is supplied to the first hydraulic clutch and subsequently supplied-to the second hydraulic clutch, the first hydraulic clutch disposed on an opposite side to a tooth flank of the bevel gear with the bevel gear therebetween.

12. The four-wheel drive vehicle according to claim 8, wherein,
the driving shaft receives a turning force of the propeller shaft via a bevel gear that rotates integrally with the driving shaft, and
the hydraulic clutches are disposed to sandwich the bevel gear between the hydraulic clutches in the vehicle width direction, and the control apparatus controls the hydraulic unit such that of the hydraulic oil is supplied to the first hydraulic clutch and subsequently supplied-to the second hydraulic clutch, the first hydraulic clutch disposed on an opposite side to a tooth flank of the bevel gear with the bevel gear therebetween.

13. A method for controlling a four-wheel drive vehicle that enables switching between a four-wheel drive state where a driving force of a driving source is transmitted to a pair of right and left main driving wheels and a pair of right and left auxiliary driving wheels and a two-wheel drive state where the driving force of the driving source is transmitted only to the main driving wheels, the four-wheel drive vehicle including:
a propeller shaft that transmits the driving force of the driving source to the auxiliary driving wheels in the four-wheel drive state;
a transmission and cut-off mechanism that cuts off transmission of the driving force from the driving source to the propeller shaft in the two-wheel drive state and that enables transmission of the driving force from the driving source to the propeller shaft in the four-wheel drive state;
a driving shaft that rotates under a turning force of the propeller shaft and that has a rotation axis extending in a vehicle width direction;
a pair of hydraulic clutches each disposed between the driving shaft and a corresponding one of the auxiliary driving wheels and having a plurality of clutch plates that enable the driving force to be frictionally transmitted; and
a hydraulic unit that supplies hydraulic oil to the hydraulic clutches and that brings the clutch plates into frictional contact with one another using the hydraulic oil, the method comprising:
when the two-wheel drive state is shifted to the four-wheel drive state, the hydraulic oil is supplied to a first hydraulic clutch of the pair of hydraulic clutches and subsequently supplied-to a second hydraulic clutch of the pair of hydraulic clutches.

14. A four-wheel drive vehicle that enables switching between a four-wheel drive state where a driving force of a driving source is transmitted to a pair of right and left main driving wheels and a pair of right and left auxiliary driving wheels and a two-wheel drive state where the driving force of the driving source is transmitted only to the main driving wheels, the four-wheel drive vehicle comprising:
a propeller shaft that transmits the driving force of the driving source to the auxiliary driving wheels in the four-wheel drive state;
a transmission and cut-off mechanism that cuts off transmission of the driving force from the driving source to the propeller shaft in the two-wheel drive state and that enables transmission of the driving force from the driving source to the propeller shaft in the four-wheel drive state;
a driving shaft that rotates under a turning force of the propeller shaft and that has a central axis extending in a vehicle width direction;
a pair of hydraulic clutches each disposed between the driving shaft and a corresponding one of the auxiliary driving wheels and having a plurality of clutch plates that enable the driving force to be frictionally transmitted;
a hydraulic unit that supplies hydraulic oil to the hydraulic clutches and that brings the clutch plates into frictional contact with one another using the hydraulic oil; and
a control apparatus that controls the hydraulic unit, wherein,
in shifting the two-wheel drive state to the four-wheel drive state, the control apparatus supplies more of the hydraulic oil to a first hydraulic clutch of the pair of hydraulic clutches than to a second hydraulic clutch of the pair of hydraulic clutches.

* * * * *